(12) United States Patent
Kim (10) Patent No.: US 7,714,951 B2
(45) Date of Patent: May 11, 2010

(54) LIQUID CRYSTAL DISPLAY DEVICE

(75) Inventor: Jeong-Hun Kim, Busan (KR)

(73) Assignee: LG. Display Co., Ltd., Seoul (KR)

( * ) Notice: Subject to any disclaimer, the term of this patent is extended or adjusted under 35 U.S.C. 154(b) by 36 days.

(21) Appl. No.: 11/810,859

(22) Filed: Jun. 7, 2007

(65) Prior Publication Data
US 2008/0129945 A1 Jun. 5, 2008

(30) Foreign Application Priority Data
Dec. 4, 2006 (KR) ............ 10-2006-0121605

(51) Int. Cl.
*G02F 1/136* (2006.01)
*G02F 1/1339* (2006.01)
(52) U.S. Cl. ................ 349/54; 349/153
(58) Field of Classification Search ........... 349/154, 349/153
See application file for complete search history.

(56) References Cited

U.S. PATENT DOCUMENTS

| | | | | |
|---|---|---|---|---|
| 5,751,391 A * | 5/1998 | Yokoyama et al. | ......... | 349/153 |
| 5,933,209 A * | 8/1999 | Yonemoto | ......... | 349/153 |
| 6,118,509 A * | 9/2000 | Miyake | ......... | 349/153 |
| 6,466,294 B1 * | 10/2002 | Yamagishi et al. | ......... | 349/155 |
| 6,665,040 B2 * | 12/2003 | Youn | ......... | 349/153 |
| 6,888,606 B2 * | 5/2005 | Hinata et al. | ......... | 349/149 |
| 7,068,341 B2 * | 6/2006 | Nakayoshi et al. | ......... | 349/154 |
| 7,388,643 B2 * | 6/2008 | Nakayoshi et al. | ......... | 349/154 |
| 2002/0149732 A1 * | 10/2002 | Youn | ......... | 349/153 |
| 2002/0163614 A1 * | 11/2002 | Hinata et al. | ......... | 349/139 |
| 2003/0071955 A1 * | 4/2003 | Nakayoshi et al. | ......... | 349/154 |
| 2006/0028609 A1 * | 2/2006 | Nakayoshi et al. | ......... | 349/153 |
| 2008/0231792 A1 * | 9/2008 | Nakayoshi et al. | ......... | 349/153 |

FOREIGN PATENT DOCUMENTS

| | | |
|---|---|---|
| JP | 09-152620 | 6/1997 |
| JP | 2005-242099 | 9/2005 |

OTHER PUBLICATIONS

Office Action issued in corresponding Chinese Patent Application No. 200710128052.7; issued Feb. 13, 2009.

* cited by examiner

*Primary Examiner*—K. Cyrus Kianni
(74) *Attorney, Agent, or Firm*—Brinks Hofer Gilson & Lione (57) ABSTRACT

A liquid crystal display (LCD) device includes: a first substrate opposite a second substrate and coupled to the second substrate by a first seal pattern; a liquid crystal layer interposed between the first and second substrates within the first seal pattern; a second seal pattern sealing an injection hole in the first seal pattern; and a common line disposed at a first surface of the first substrate and having a predetermined pattern that exposes the second seal pattern to a second surface of the first substrate.

14 Claims, 11 Drawing Sheets

*FIG. 1*

*(RELATED ART)*

*FIG. 2*

*(RELATED ART)*

FIG. 3

*(RELATED ART)*

*FIG. 4A*

*(RELATED ART)*

*FIG. 4B*

*(RELATED ART)*

LIQUID CRYSTAL DISPLAY DEVICE

This application claims the benefit of Korean Patent Application No. 10-2006-0121605, filed on Dec. 4, 2006 in Korea, which is hereby incorporated by reference for all purposes as if fully set forth herein.

BACKGROUND

1. Technical Field

The present invention relates to a liquid crystal display device, and more particularly, to a liquid crystal display (LCD) device and a method of fabricating the same.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmittance of the LCD device. Thus, the LCD device displays images by varying the intensity of the induced electric field.

Figure 1:
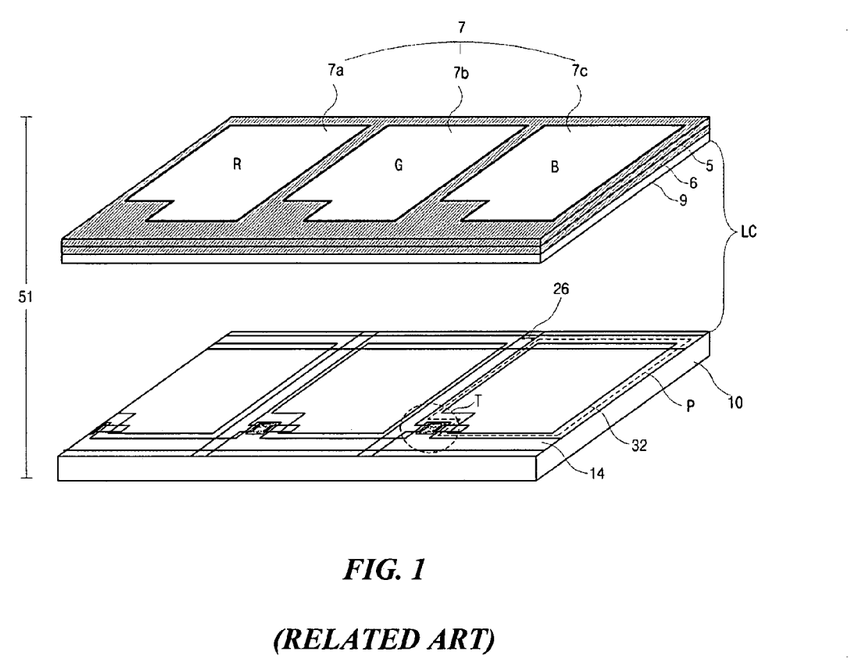
FIG. 1 is a schematic perspective view illustrating an LCD device according to the related art.

FIG. 1 is a schematic perspective view illustrating an LCD device according to the related art.

In FIG. 1, the LCD device 51 includes an upper substrate 5, a lower substrate 10 facing and spaced apart from the upper substrate 5, and a liquid crystal layer "LC" between the upper and lower substrates 5 and 10.

A gate line 14 and a data line 26 cross each other to define a pixel region "P" on an inner surface of the lower substrate 10, a thin film transistor "T" is formed at crossing the gate line 14 and the data line 26, and a pixel electrode 32 is connected to the thin film transistor "T" in the pixel region "P."

Further, a black matrix 6 is formed on an inner surface of the upper substrate 5, a color filter layer 7 is formed on the black matrix 6, and a common electrode 9 is formed on the color filter layer 7. Here, the color filter layer 7 includes red, green and blue sub-color filters 7a, 7b and 7c. Each of the red, green and blue sub-color filters 7a, 7b and 7c is disposed in the pixel region "P," and the black matrix 6 is disposed in a non-pixel region (not shown) in a periphery of the pixel region "P."

The first and second substrates 5 and 10 are attached with a seal pattern (not shown). The LCD device 51 operates with signals from an external printed circuit board (not shown). The gate line 14 is supplied with a gate signal, the data line 26 is supplied with a data signal, and the common electrode 9 is supplied with a common signal.

The gate signal switches the thin film transistor "T" and the data signal is applied to the pixel electrode 32. By applying the pixel and common electrodes 32 and 9 to the corresponding signals, an electric field is induced. Liquid crystal molecules of the liquid crystal layer "LC" are arranged by the induced electric field, and the light transmittance of the LCD device 51 is changed, thus images are displayed.

A gate pad and a data pad (not shown) are formed at one ends of the gate line 14 and the data line 26 to be supplied with the gate signal and the data signal, respectively.

Figure 2:
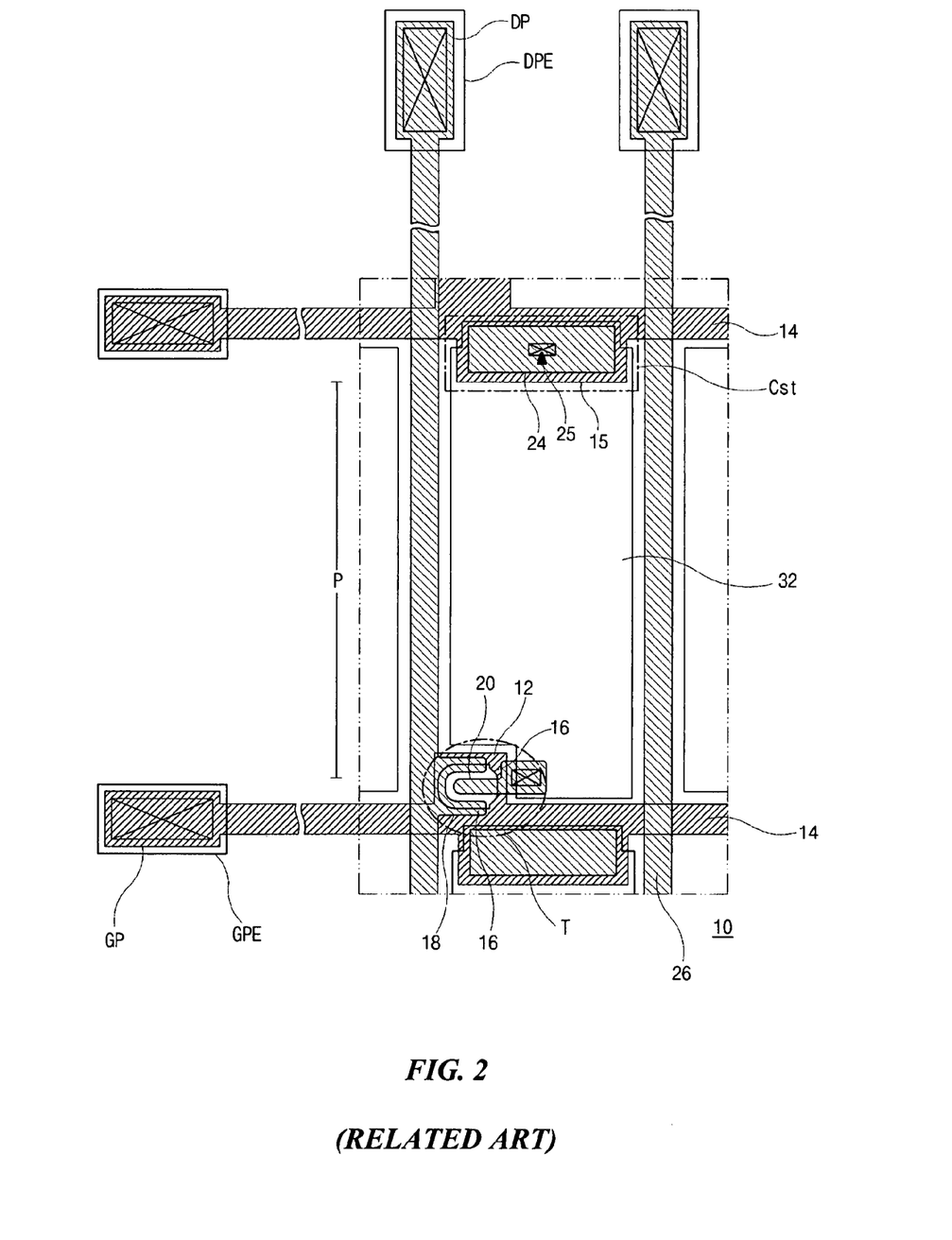
FIG. 2 is a schematic plan view illustrating an array substrate for an LCD device according to the related art.

FIG. 2 is a schematic plan view illustrating an array substrate for an LCD device according to the related art.

In FIG. 2, the gate line 14 and the data line 26 crosses each other to define the pixel region "P" on the upper substrate 10. A gate pad "GP" is at one end of the gate line 14, and a data pad "DP" is at one end of the data line 26. A gate pad electrode "GPE" contacts and is on the gate pad "GP," and a data pad electrode "DPE" contacts and is on the data pad "DP". A thin film transistor "T" is located at a crossing of the gate and data lines 14 and 26. The thin film transistor "T" includes a gate electrode 12, a semiconductor layer 16 and source and drain electrodes 18 and 20. A pixel electrode 32 is disposed in the pixel region "P" and connected to the drain electrode 20.

A first capacitor electrode 15 extends from the gate line 14, and a second capacitor electrode 24 overlaps with the first capacitor electrode 15 and is connected to the pixel electrode 32 via a contact hole 25. The first and second capacitor electrodes 15 and 24 and an insulating layer (not shown) therebetween constitute a storage capacitor "Cst."

The gate and data pads "GP and DP" are disposed in a non-display region (not shown). Other signals lines are also formed in the non-display region, for example, a common line (not shown) is formed in the non-display region. When a small-sized LCD device is fabricated, the first and second substrates 5 and 10 (of FIG. 1) are attached with a conductive seal pattern (not shown). The common line (not shown) contacts the conductive seal pattern to supply a common signal to the common electrode 9 (FIG. 1).

Figure 3:
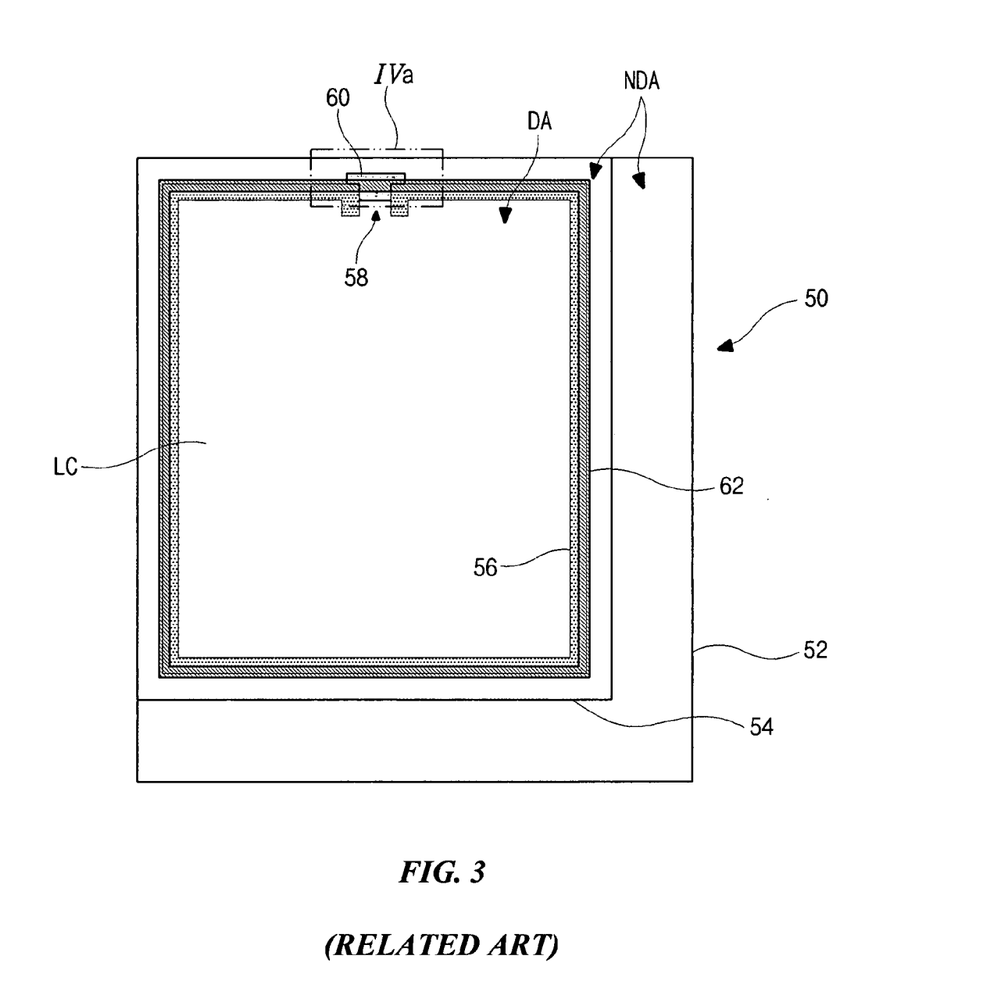
FIG. 3 is a schematic plan view illustrating an LCD device according to the related art.

FIG. 3 is a schematic plan view illustrating an LCD device according to the related art.

In FIG. 3, the LCD device 50 includes first and second substrates 52 and 54 attached with a conductive seal pattern 56. The LCD device 50 has a display region "DA" and a non-display region "NDA" in a periphery of the display region "DA."

When the first substrate 52 is an array substrate and the second substrate 54 is a color filter substrate, the first substrate 52 protrudes beyond the second substrate 54.

The conductive seal pattern 56 attaches the first and second substrates 52 and 54 and maintains a cell gap between the first and second substrates 52 and 54. Further, the conductive seal pattern 56 has an injection hole 58 for injecting a liquid crystal layer "LC" between the first and second substrates 52 and 54, and an adhesive pattern 60 seals the injection hole 58 after injecting the liquid crystal layer "LC." Further, a common line 62 is formed at a boundary between the display region "DA" and the non-display region "NDA" to contact the conductive seal pattern 56. Therefore, a portion of the common line 62 overlaps with the adhesive pattern 60 at the injection hole 58 in a plan view. Here, the common line 62 is formed with the same material and through the same process as the gate line 14 (of FIG. 2).

During manufacturing, a plurality of liquid crystal panels are arranged with the injection holes 58 facing upward, and one side of the liquid crystal panels are rubbed with sealing material using a roller which has sealing material thereon. The sealing material permeates inside of the injection hole 58 by a capillary phenomenon. The sealing material of the adhesive pattern 60 is hardened by irradiating UV (ultra violet) light and thus able to seal the injection hole 58. Generally, the UV light is irradiated from the first substrate 52 to the second substrate 54, so a portion of the adhesive pattern 60 overlapping with the common line 62 is uncured.

Figure 4A:
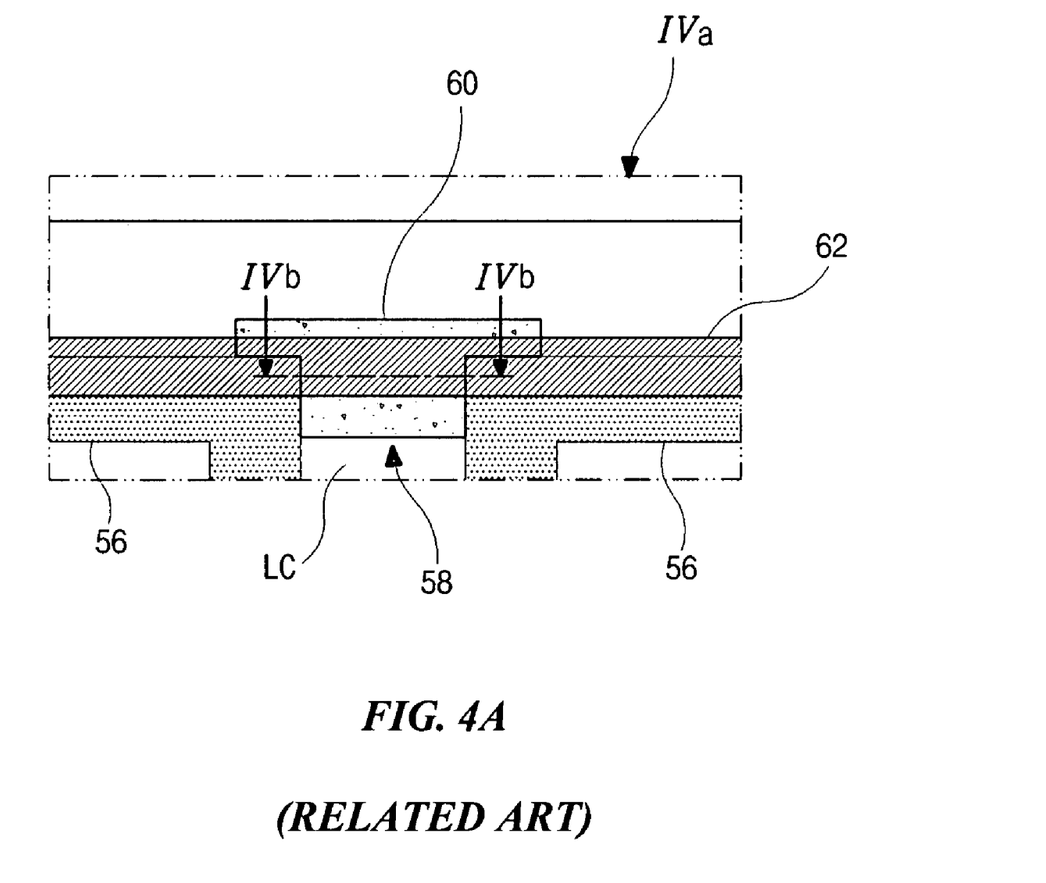
FIGS. 4A and 4B are schematic views illustrating a region of an injection hole for an LCD device according to the related art.
Figure 4B:
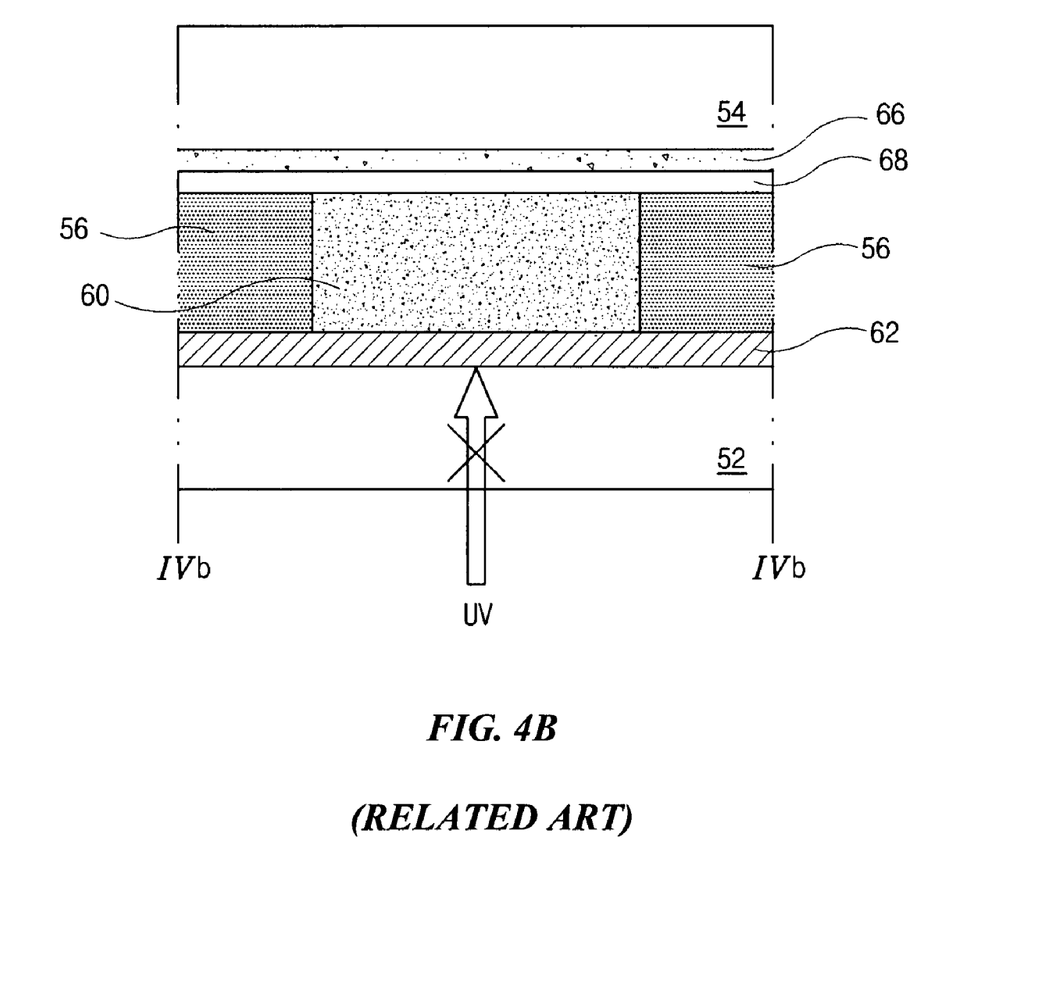

FIGS. 4A and 4B are schematic views illustrating a region of an injection hole for an LCD device according to the related art. FIG. 4A is an expanded view of an area "IVa" of FIG. 3, and FIG. 4B is a cross-sectional view taken along a line "IVb-IVb" of FIG. 4A.

In FIGS. 4A and 4B, the injection hole 58 of the conductive seal pattern 56 is sealed by the adhesive pattern 60. That is, the liquid crystal layer "LC" can be shielded from outside by the adhesive pattern 60. As explained above, the adhesive pattern 60 can properly act as a sealing means when the adhesive pattern 60 is completely hardened. However, the adhesive pattern 60 cannot be completely hardened because the adhesive pattern 60 overlaps with the common line 62 which is disposed at an irradiating direction of the UV light. Therefore, the adhesive pattern 60 is partially hardened due to the common line 62, so the adhesive pattern 60 may mix with the liquid crystal layer "LC." Even if the UV light is irradiated toward the second substrate 54, a black matrix 66 on the second substrate 54 shields the adhesive pattern 60.

Therefore, the adhesive pattern 60 is not completely hardened after hardening process, so the uncured portion of the adhesive pattern 60 may be mixed with a portion of the liquid crystal layer "LC" contacting the adhesive pattern 60. Accordingly, the adhesive pattern 60 acts as impurities in the liquid crystal layer "LC," so an image defect occurs such as light leakage or screen stain.

Specifically, as shown in FIG. 4B, the common line 62 is formed on the first substrate 52, the conductive seal pattern 56 including the injection hole 58 and the adhesive pattern 60 in the injection hole 58 are formed on the common line 62.

A black matrix 66 is formed on the second substrate 54 and a common electrode 68 is formed on the black matrix 66. That is, the conductive seal pattern 56 and the adhesive pattern 60 are disposed between the common line 62 and the common electrode 68. As shown in FIG. 4B, the UV light does not reach the adhesive pattern 60 because the common line 62 interrupts irradiation of the UV light onto the adhesive pattern 60.

SUMMARY

In one embodiment, a liquid crystal display (LCD) device includes: a first substrate opposite a second substrate and coupled to the second substrate by a first seal pattern; a liquid crystal layer interposed between the first and second substrates within the first seal pattern; a second seal pattern sealing an injection hole in the first seal pattern; and a common line disposed at a first surface of the first substrate and having a predetermined pattern that exposes the second seal pattern to a second surface of the first substrate.

In another embodiment, a method of fabricating a liquid crystal display device includes; forming a common line with a predetermined pattern on a first surface of a first substrate; coupling the first substrate with a second substrate using a first seal pattern; injecting a liquid crystal layer between the first and second substrates through an injection hole in the first seal pattern; sealing the injection hole with a second seal pattern; and hardening the second seal pattern; wherein the predetermined pattern exposes the second seal pattern to reduce a blocking of the second seal pattern by the common line.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to the illustrated embodiment of the present invention, which is illustrated in the accompanying drawings. Wherever possible, similar reference numbers will be used throughout the drawings to refer to the same or like parts.

Figure 5:
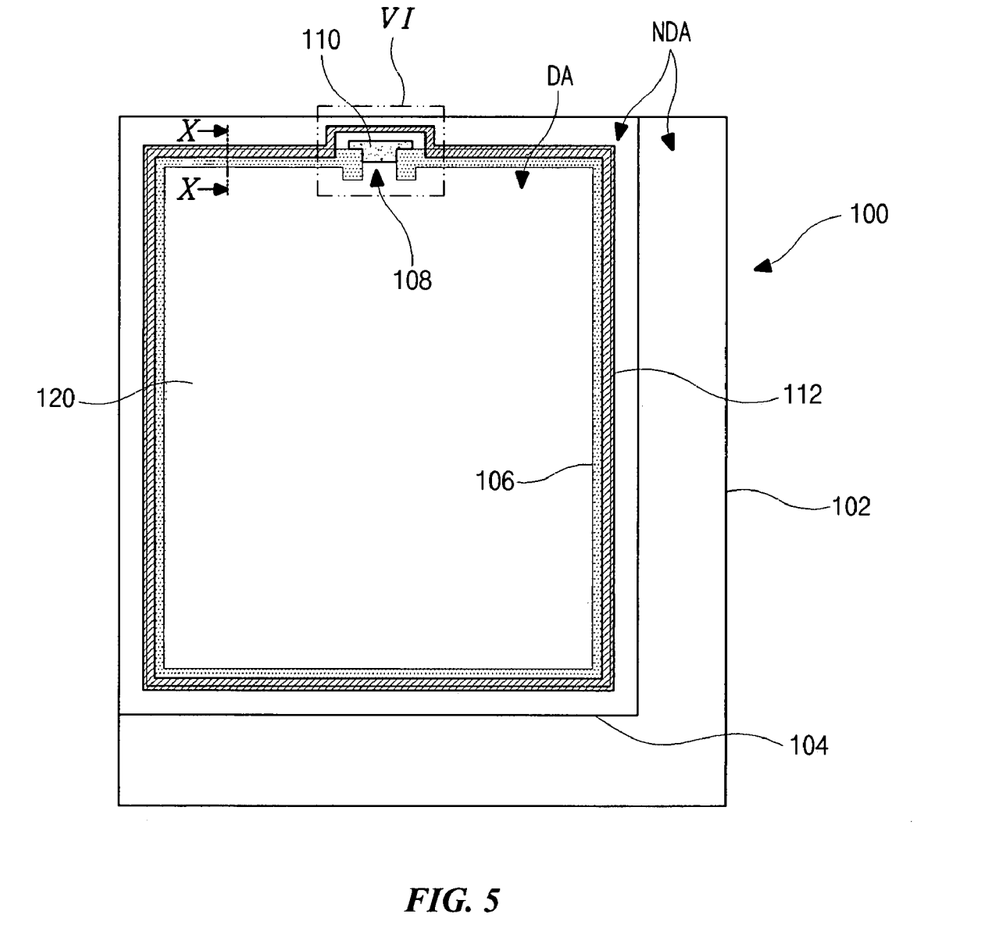
FIG. 5 is a schematic plan view illustrating an LCD device according to an embodiment of the present invention.
Figure 6:
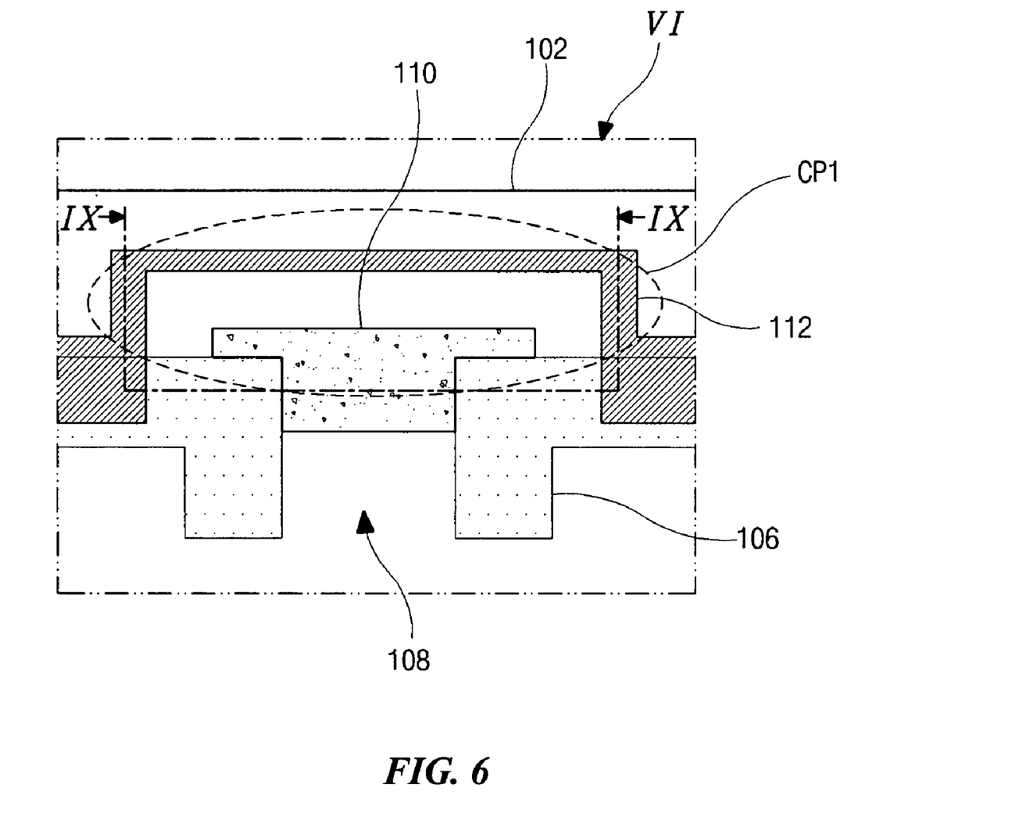
FIG. 6 is an expanded view of an area "VI" of FIG. 5 according to an embodiment of the present invention.

FIG. 5 is a schematic plan view illustrating an LCD device according to an embodiment of the present invention. FIG. 6 is an expanded view of an area "VI" of FIG. 5 according to an embodiment of the present invention.

In FIGS. 5 and 6, the LCD device 100 includes first and second substrates 102 and 104 attached with a first seal pattern 106, and a liquid crystal layer 120 is interposed within the first seal pattern 106 between the first and second substrates 102 and 104. Specifically, the first seal pattern 106 includes an injection hole 108, and the injection hole 108 is sealed using a second seal pattern 110 after injecting the liquid crystal layer 120. In particular, the first seal pattern 106 includes a conductive sealant that has a glass fiber and a conductive ball which includes gold (Au).

The LCD device 100 has a display region "DA" and a non-display region "NDA" in a periphery of the display region "DA."

For example, when the first substrate 102 is an array substrate and the second substrate 104 is a color filter substrate, the first substrate 102 protrudes beyond from the second substrate 104. In the protruded portion of the first substrate 102, although not shown, a driving circuit is connected to the gate and data pads "GP and DP" (FIG. 2) and a connector (not shown) is connected to a PCB (not shown). The connector is connected to the driving circuit to transfer signals from the PCB. However, although the protruded portion of the first substrate 102 is defined at two sides of the first substrate 102 as shown in FIG. 5, the protruded portion of the first substrate 102 may be defined at one side of the first substrate 102. In other words, the driving circuits may be formed at one side of the first substrate 102 in the non-display region "NDA."

The liquid crystal layer 120 can maintain its shape by the first seal pattern 106. Further, a common line 112 surrounds a boundary between the display region "DA" and the non-display region "NDA" to contact the first seal pattern 106.

In particular, the common line 112 has a convex pattern "CP1" at the injection hole 108 to expose the second seal pattern 110 toward the first substrate 102. Accordingly, the second seal pattern 110 can be completely hardened through the curing process because the UV light is directly passed onto the second seal pattern 110 without any metal pattern between the first substrate 102 and the second seal pattern 110. That is, because the second seal pattern does not have an uncured portion, an image defect due to the uncured portion of the second seal pattern 110 does not occur.

In accordance with the illustrated embodiment, the common line 112 has a closed shape without an opening. If the common line 112 has an opening, static electricity between facing portions of the common line 112 at the opening may be generated. Therefore, the common line 112 that is electrically connected to a common electrode (not shown) using the first seal pattern of the conductive sealant should have a closed shape to prevent the image defect due to the static electricity.

Figure 7:
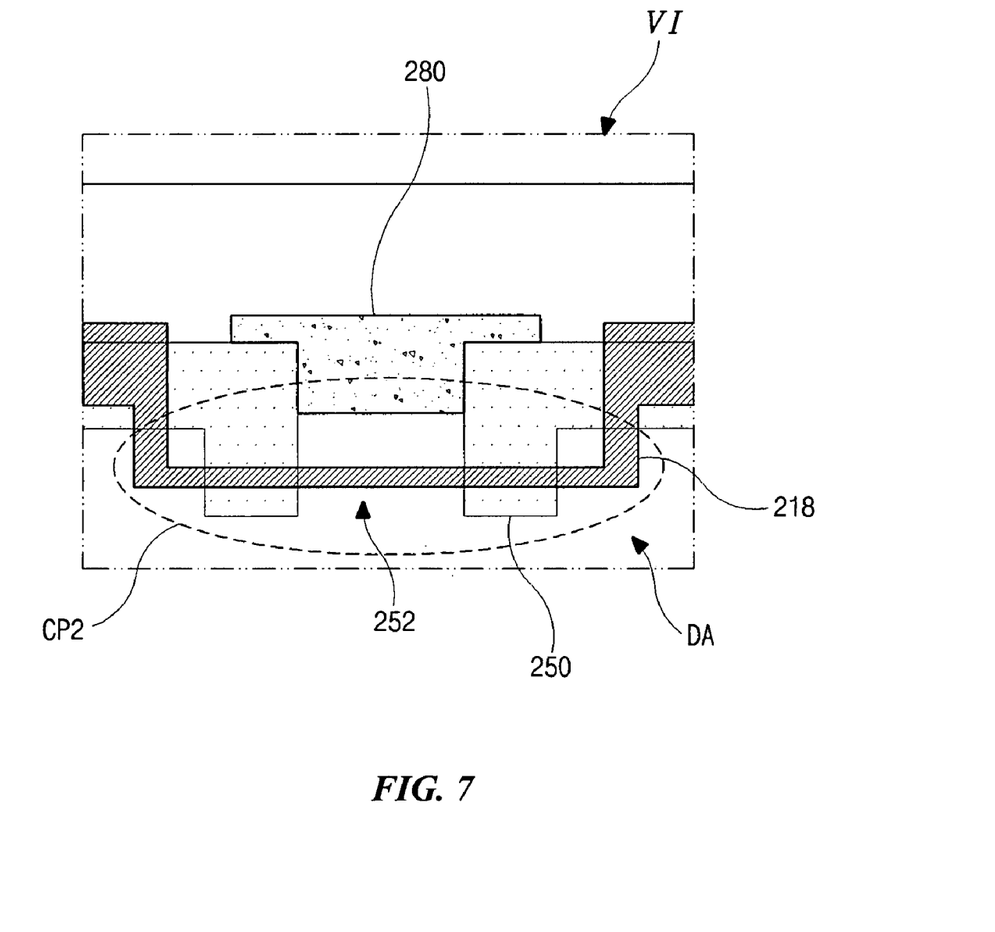
FIGS. 7 and 8 are schematic plan view illustrating a region of an injection hole of an LCD device according to embodiments of the present invention.
Figure 8:
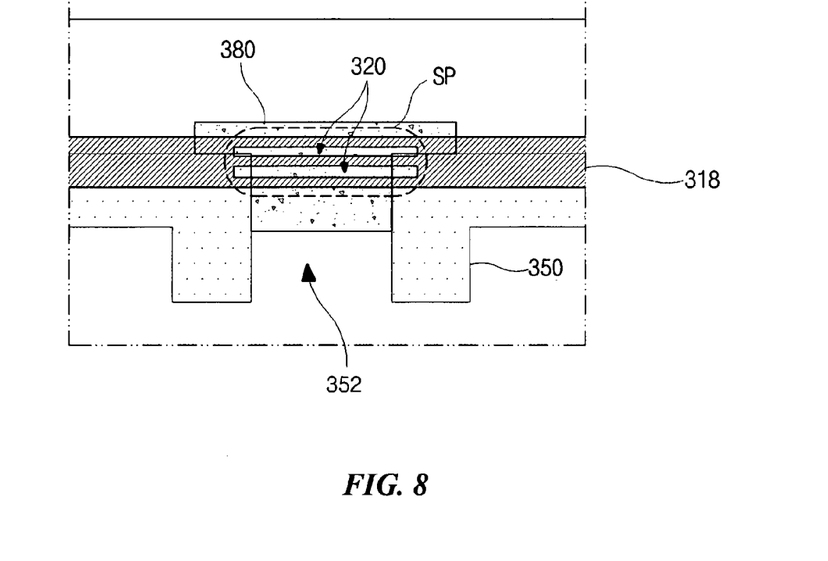

FIGS. 7 and 8 are schematic plan views illustrating a region of an injection hole of an LCD device according to embodiments of the present invention.

In FIG. 7, a common line 218 includes a concave pattern "CP2" that is bent toward the display region "DA" to expose a second seal pattern 280.

Alternatively, as shown in FIG. 8, a common line 318 has a slit portion "SP" including a plurality of slits 320 at a portion of an injection hole 352 to partially expose a second seal pattern 380. Specifically, the second seal pattern 380 can be completely hardened by diffraction exposing due to the plurality of slits 320 without an uncured portion.

Figure 9:
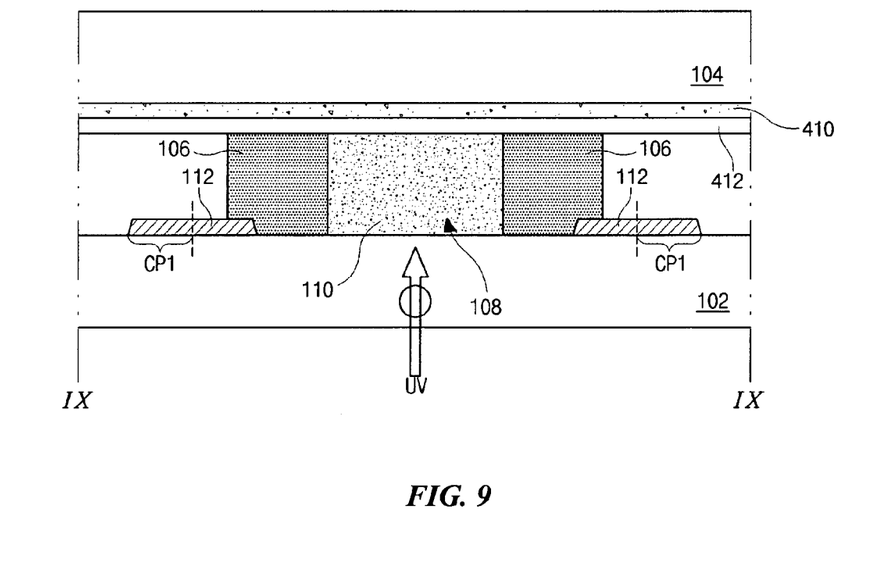
FIG. 9 is a schematic cross-sectional view taken along a line "IX-IX" of FIG. 6 according to an embodiment of the present invention.

FIG. 9 is a schematic cross-sectional view taken along a line "IX-IX" of FIG. 6 according to an embodiment of the present invention.

In FIG. 9, the common line 112 including the convex pattern "CP1" is formed on an inner surface of the first substrate 102, the first seal pattern 106 including the injection hole 108 is formed on the common line 112 and the first substrate 102, and the second seal pattern 110 is formed at the injection hole 108. A black matrix 410 is formed on an inner surface of the second substrate 104, and a common electrode 412 is formed on the black matrix 410. Although not shown, a color filter layer (not shown) is formed between the black matrix 410 and the common electrode 412 in the display region "DA" (FIG. 5).

As shown in FIG. 9, the common line 112 does not shield the second seal pattern 110, so UV light can be reached to the second seal pattern 110 without any metal line between the first substrate 102 and the second seal pattern 104. Accordingly, the second seal pattern 110 can be completely hardened.

Figure 10A:
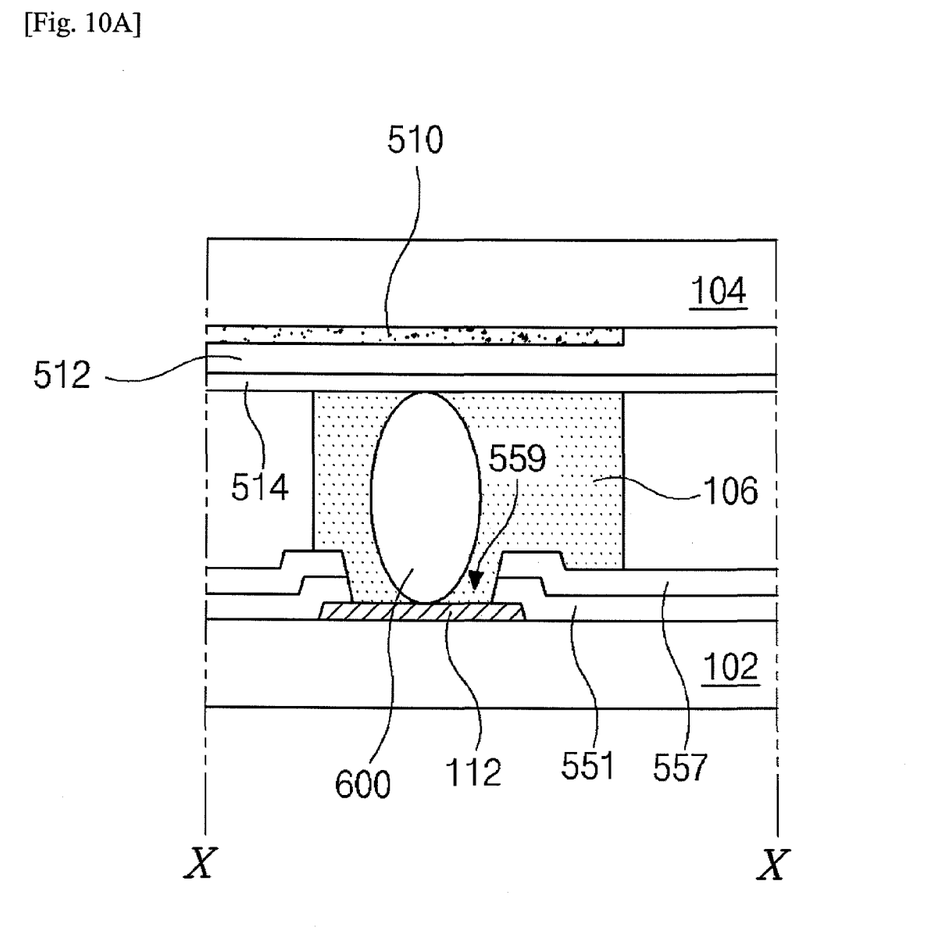
FIGS. 10A and 10B are cross-sectional views illustrating an LCD device according to an embodiment of the present invention.
Figure 10B:
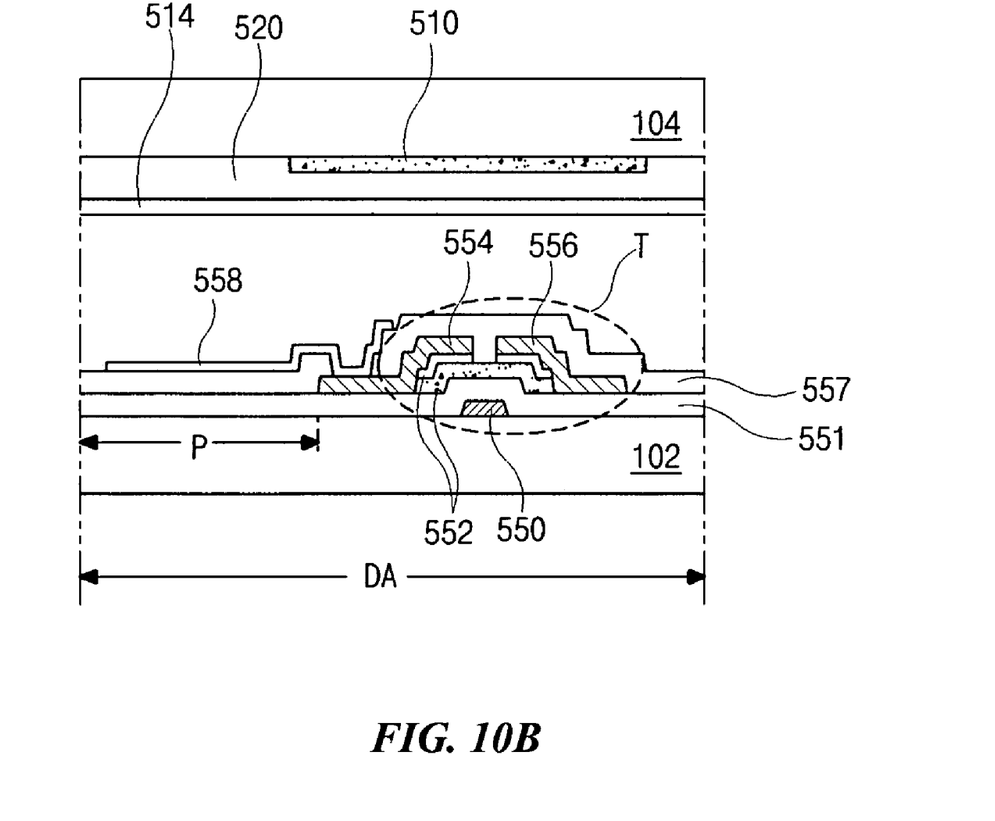

FIGS. 10A and 10B are cross-sectional views illustrating an LCD device according to an embodiment of the present invention. FIG. 10A is a view taken along a line "X-X" of FIG. 5, and FIG. 10B is a view illustrating a display region of the LCD device.

In FIG. 10A, the common line 112 is formed on the inner surface of the first substrate 102, and the first seal pattern 106 contacts the common line 112. Further, a black matrix 510 is formed on the inner surface of the second substrate 104, a dummy color filter pattern 512 is formed on the black matrix 510, and the common electrode 514 is formed on the dummy color filter pattern 512. Although not shown, the first seal pattern 106 includes a glass fiber and a conductive ball 600 which includes gold (Au). That is, the first seal pattern 106 can electrically connect the common line 112 and the common electrode 514 using the conductive ball 600 therein.

In FIG. 10B, a thin film transistor "T," which includes a gate electrode 550, a semiconductor layer 552, source and drain electrodes 554 and 556, is formed on an inner surface of the first substrate 102, and a pixel electrode 558 is connected to the thin film transistor "T" in the pixel region "P." Further, the black matrix 510 is formed on the inner surface of the second substrate 104, a color filter layer 520 is formed on the black matrix 510 in the pixel region "P," and the common electrode 514 is formed on the color filter layer 520. Here, the dummy color filter pattern 512 (of FIG. 10A) does not act as the color filter layer 520, but the dummy color filter pattern 512 is formed with the same material as the color filter layer 520. However, the color filter layer 520 may be formed on the first substrate 102 and not on the second substrate 104. Further, the dummy color filter pattern 512 may be omitted as shown in FIG. 9.

As illustrated in FIG. 10B, a gate insulating layer 551 is formed between the gate electrode 550 and the semiconductor layer 552, and a passivation layer 557 is formed between the thin film transistor "T" and the pixel electrode 558. The gate insulating layer 551 and the passivation layer 557 are formed between the common line 112 and the first seal pattern 106 and have a contact hole 559 that exposes a portion of the common line 112 to connect the common line 112 and the first seal pattern 106 as shown in FIG. 10A.

That is, the common line 112 and the gate electrode 550 are formed with the same material on the same layer as each other. However, the common line 112 may be formed with a different material on a different layer from the gate electrode 550.

Although not shown, a gate line is connected to the gate electrode 550 along a first direction, and a gate pad is formed at an end portion of the gate line. Further, a data line is connected to the source electrode along a second direction crossing the first direction to define the pixel region "P," and a data pad is formed at an end portion of the data line. For example, a portion of the gate line crossing the common line 112 is formed with the same material as the data line to prevent shorting between the common line 112 and the gate line. For example, the gate line and the gate pad are connected to a gate link line of the same material as the data line at an overlapped portion with the common line 112.

Although not shown, a method for fabricating the LCD device may include forming the common line on the first substrate, forming the first seal pattern including the injection hole on the common line, forming a common electrode on a second substrate, attaching the first and second substrates with the first seal pattern, injecting a liquid crystal layer into the injection hole, sealing the injection hole using a second seal pattern, and curing the second seal pattern toward the first substrate, wherein the common line exposes the second seal pattern toward the first substrate.

According to the LCD device, since the common line does not overlap with the second seal pattern, the second seal pattern is completely hardened. Therefore, image defects such as light leakage or screen stain due to the uncured second seal pattern are not generated. Therefore, a high image quality can be obtained.

While the invention has been particularly shown and described with reference to an illustrated embodiment thereof, it will be understood by those skilled in the art that the foregoing and other changes in form and details may be made therein without departing from the spirit and scope of the invention.

What is claimed is:

1. A liquid crystal display (LCD) device, comprising:
   a first substrate opposite a second substrate and coupled to the second substrate by a first seal pattern;
   a liquid crystal layer interposed between the first and second substrates within the first seal pattern;
   a second seal pattern sealing an injection hole in the first seal pattern; and
   a common line disposed at a first surface of the first substrate and having a predetermined pattern that exposes the second seal pattern to a second surface of the first substrate, wherein the predetermined pattern is disposed on the first surface of the first substrate adjacent to the second seal pattern.

2. The LCD device of claim 1 wherein the first surface is an inner surface of the first substrate and the second surface is an outer surface of the first substrate.

3. The LCD device of claim 2 wherein the outer surface of the first substrate is adjacent a light source, further wherein the second seal pattern is exposed to the light source.

4. The LCD device of claim 1 further comprising:
   a gate line and a data line crossing each other on the first surface of the first substrate;
   a thin film transistor disposed at the crossing of the gate line and the data line; and
   a pixel electrode connected with the thin film transistor.

5. The LCD device of claim 4, wherein the common line is formed at the same layer and with the same material as the gate line.

6. The LCD device of claim 1 further comprising a common electrode on a first surface of the second substrate, the common electrode connected with the common line by the first seal pattern.

7. The LCD device of claim 1, wherein the predetermined pattern of the common line is a convex pattern, wherein the common line is spaced apart from the second seal pattern away from the liquid crystal layer.

8. The LCD device of claim 1, wherein the predetermined pattern of the common line is a concave pattern, wherein the common line is spaced apart from the second seal pattern toward the liquid crystal layer.

9. The LCD device of claim 1, wherein the predetermined pattern of the common line includes a plurality of slits in the common line.

10. The LCD device of claim 1, wherein the first seal pattern comprises a plurality of conductive balls.

11. The LCD device of claim 1, wherein the common line has a closed shape.

12. The LCD device of claim 1, wherein the first seal pattern is connected to the common line via a contact hole in an insulating layer, the contact hole exposing a portion of the common line.

13. The LCD device of claim 1 further comprising a black matrix layer, wherein the second seal pattern resides between the common line and the black matrix layer.

14. The LCD device of claim 1, wherein the first substrate and the predetermined pattern of the common line are arranged to provide an optical pathway through the first substrate.

* * * * *